Sept. 5, 1950 J. R. WILSON 2,521,030
FLOATING DRILL JIG APPARATUS
Filed April 9, 1949 4 Sheets-Sheet 1
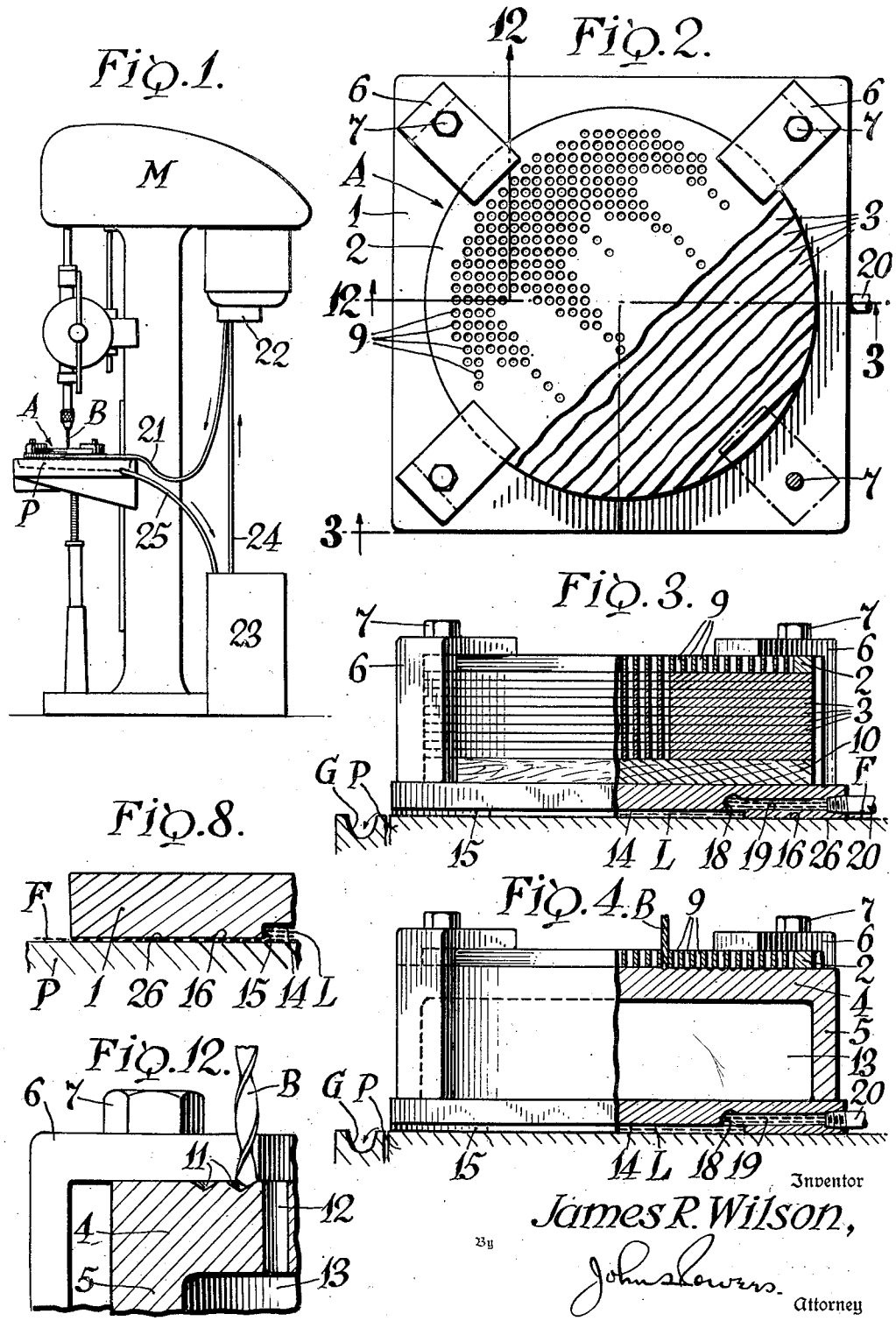
Inventor
James R. Wilson,
By John Showers
Attorney

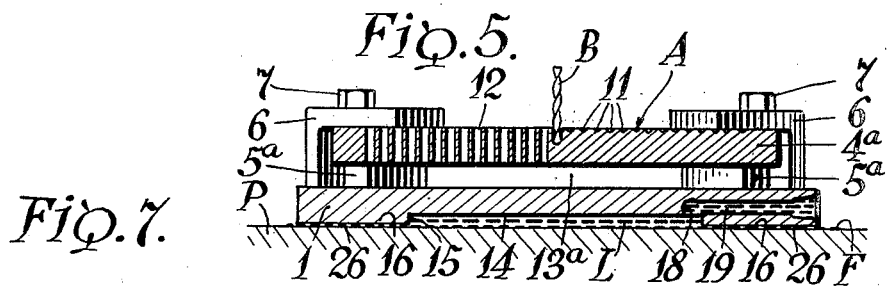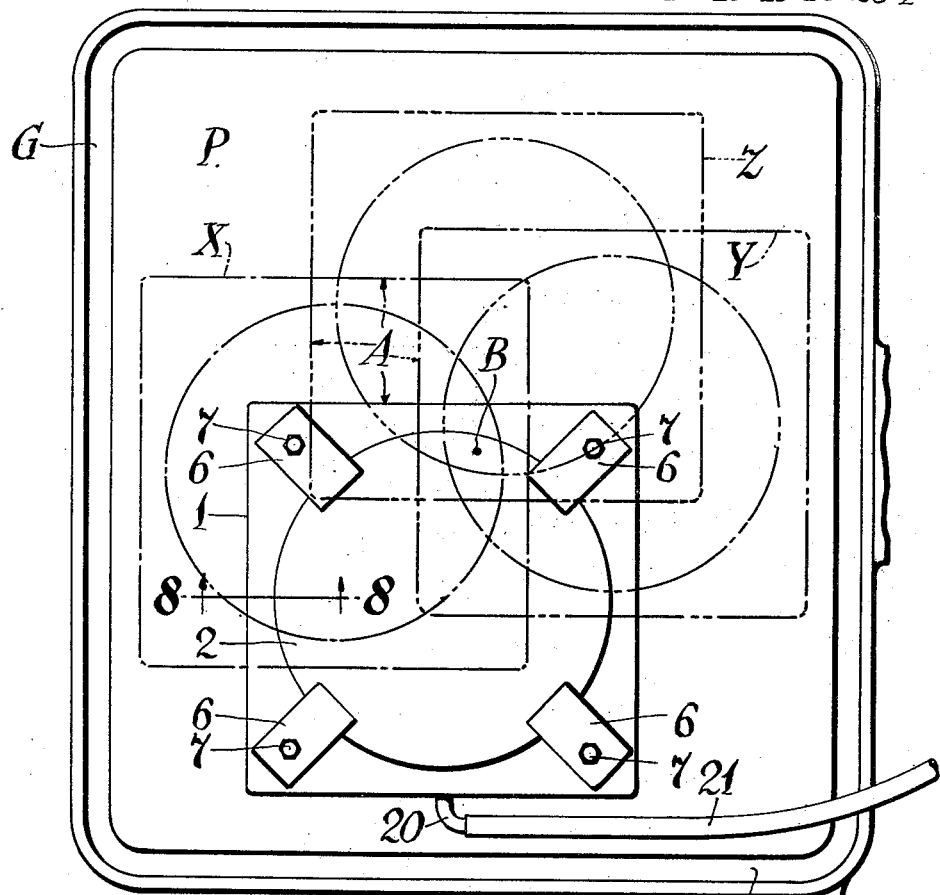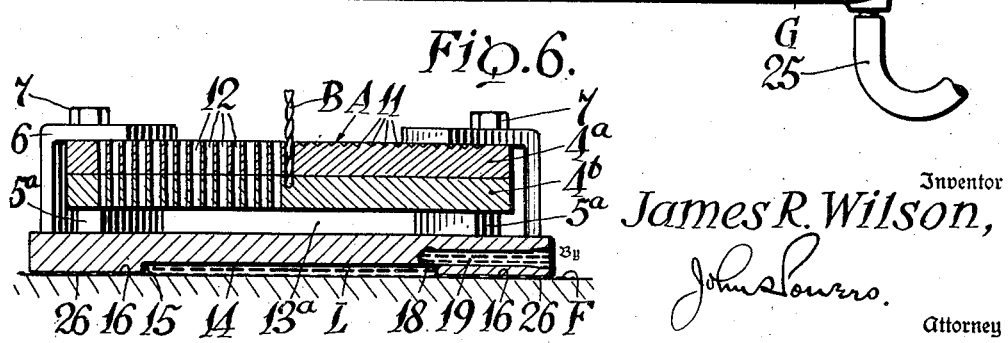

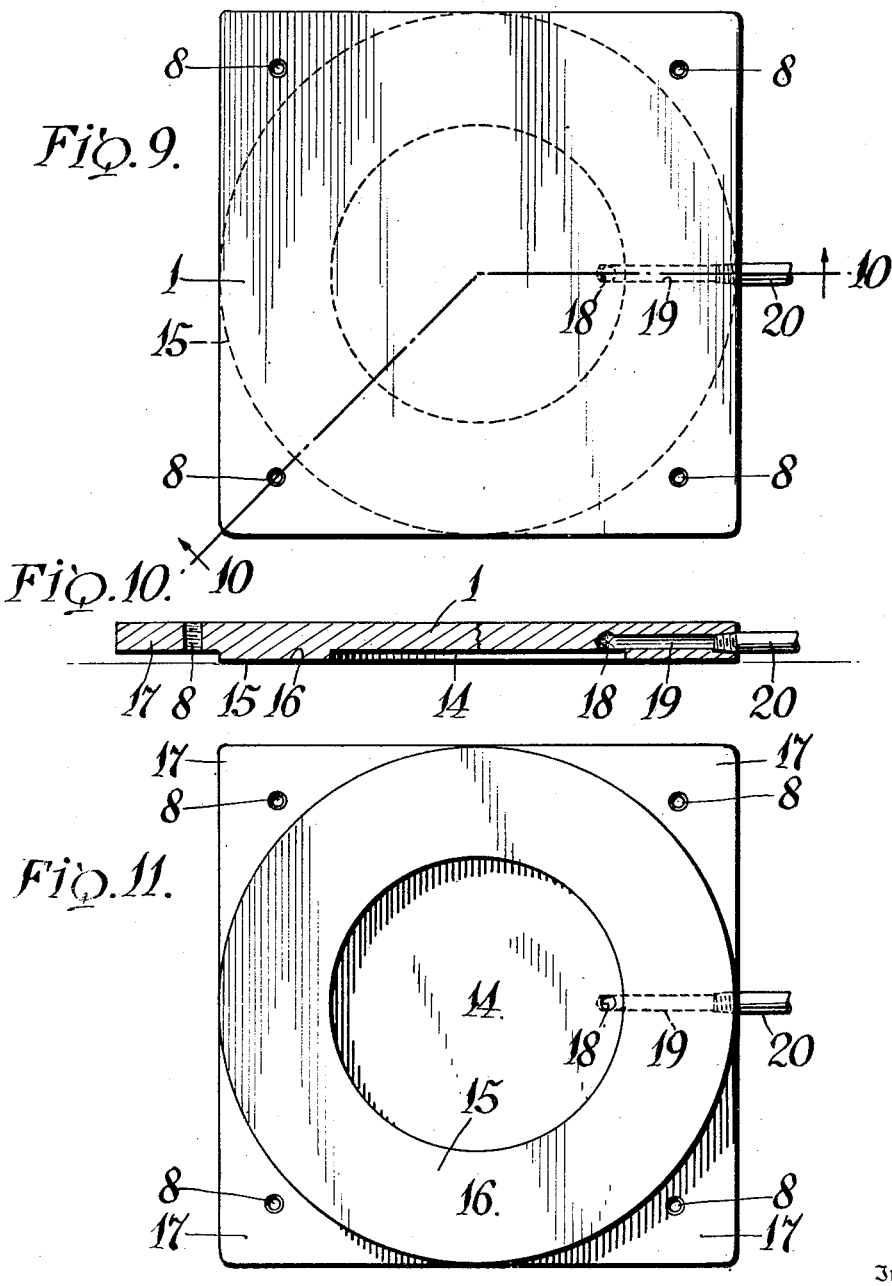

Sept. 5, 1950          J. R. WILSON          2,521,030
FLOATING DRILL JIG APPARATUS
Filed April 9, 1949          4 Sheets—Sheet 4
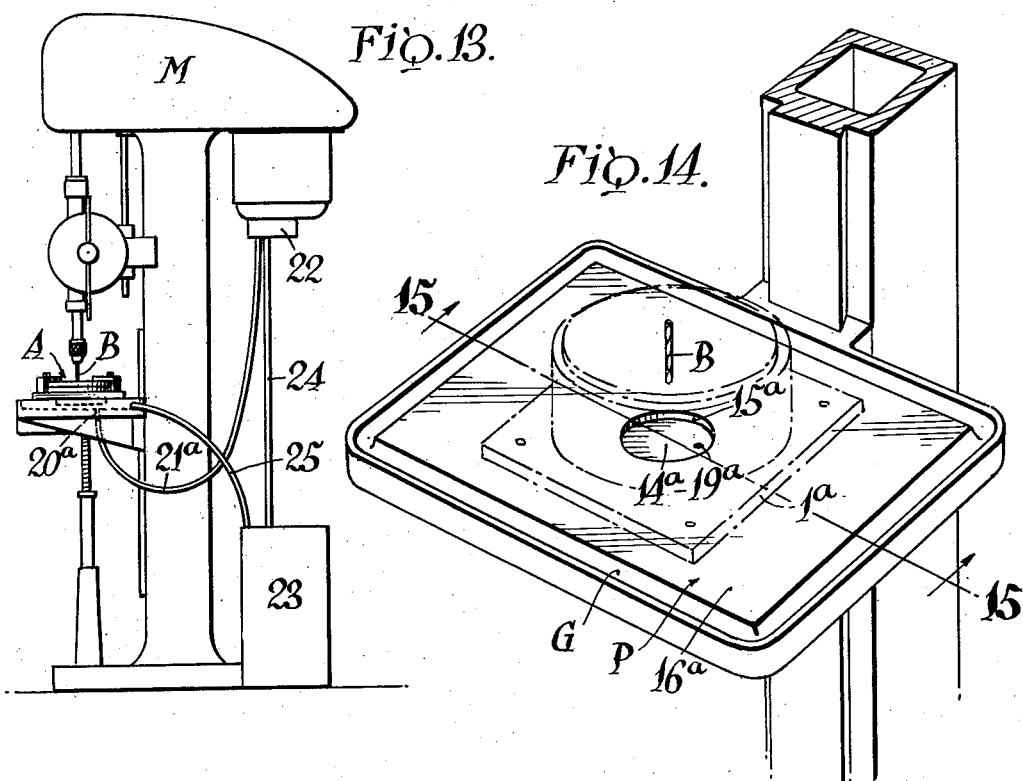
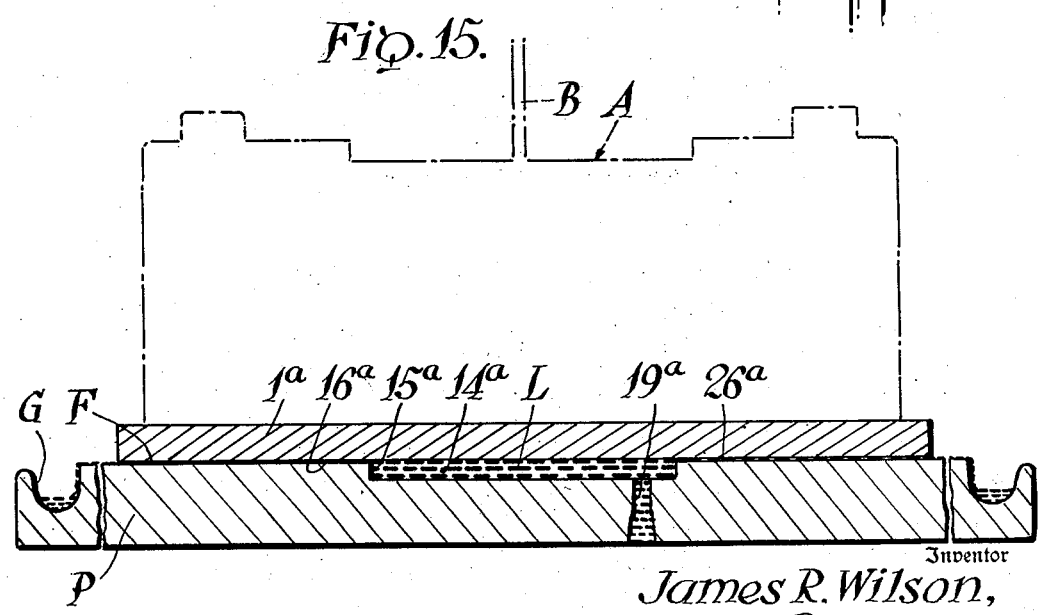
Inventor
James R. Wilson,
By
Attorney Patented Sept. 5, 1950

2,521,030

UNITED STATES PATENT OFFICE 2,521,030

FLOATING DRILL JIG APPARATUS

James R. Wilson, Buffalo, N. Y., assignor to Ross Heater & Manufacturing Co., Inc., Buffalo, N. Y., a corporation of New York Application April 9, 1949, Serial No. 86,546

6 Claims. (Cl. 77—62)

This invention relates to apparatus which, for brevity, may be designated as "floating drill jig" apparatus and which has for its purpose to facilitate the manual movement and control of jig carried work requiring a large number of successive drilling operations. The apparatus includes, in a preferred form, a novel construction of jig and the invention also comprehends the novel jig per se.

Generally speaking, the invention, in point of utility and advantage, is concerned with manufacturing operations in connection with a part which requires a large number of closely associated drilled openings of relatively small diameter, the terminology "large number" meaning any number of drilled openings, for example a number reckoned in hundreds, in connection with which the invention will effect substantial economy.

As an example of the utility of the invention reference may be made, for the purpose of exposition, to the manufacture of heat exchangers.

Economy and efficiency of operation of heat exchangers, designed for various specific purposes, require in many cases a large number of closely associated tubes of relatively small diameter. For example, a tube sheet apertured to receive 1425 tubes, each of one-quarter inch outside diameter, is not unusual. In many cases a greater number of tubes may be required. The openings in the tube sheet in which the ends of the tubes are fitted are drilled in as close adjacency as possible consistent with not impairing the strength of the tube sheet, thereby to provide for a maximum number of tubes within the area of the tube sheet and to achieve the greatest possible degree of efficiency of operation. Thus the webs by which adjacent openings in a row of openings for tubes of one-quarter inch or somewhat greater outside diameter are separated are in many cases of less width than the diameter of the openings.

In the manufacture of heat exchangers standard procedure involves the use of a template of hardened tool steel having apertures corresponding in number, diameter and arrangement to the tubes required for the particular installation. This template, a very expensive item of the equipment, is used in the "spotting" of the tube sheet which is supported upon a jig. After the spotting operation, the template is removed and the openings for the tubes are drilled in the tube sheet. The spotting operation, followed by the operation of directly drilling the tube sheet, is practiced for various reasons of economy of manufacture unnecessary to set forth in detail. Another template of softer and less expensive steel (and which may be drilled from the hardened tool steel template above mentioned) is used in connection with the direct drilling of the tube openings in the baffle plates, also supported upon the jig.

For the spotting and drilling of the tube sheet blank and the drilling of the baffles a standard multiple drill is not practical because of the large number of drill bits necessary and the excessive power required for their use. A radial drill is not practical because, within sound limits of manufacturing economy, its bit cannot be accurately alined with the holes in the template or the spotting recesses in the tube sheet.

For practical purposes, and in order to operate within economic limits, the practice, to which the invention conforms, is to use a drill having a single bit, preferably, though of course not necessarily, a so-called "sensitive" drill, and to shift the assembly of the jig and the parts which it carries upon the supporting bed plate of the drilling machine relatively to the bit, thereby to aline the drill bit successively with the openings in the template or with the spotting recesses in the tube sheet blank.

The practice, as heretofore carried out, has a number of serious objections. The assembly of the jig and the parts which it carries is in any case heavy and in shifting it upon the supporting bed plate of the drilling machine fatiguing physical effort is required. The alinement of the drill bit with the openings in the template or with the spotting recesses in the tube sheet blank is difficult to effect and due to the mutually close relation of the small diameter template openings or tube sheet recesses involves fatiguing eye strain. In respect to the alinement of the drill bit with a template opening or tube sheet recess much depends on the skill and care exercised by the individual worker, some of whom, of course, produce more satisfactory work than others. In any case, despite the operator's best care and skill, it frequently happens that the bit will not be accurately alined with the template opening or tube sheet recess and such errors in alinement are apt to cause impairment of the template and in some cases the complete spoilage of the tube sheet. Where the bit is not accurately alined with a template opening or tube sheet recess it will be sprung as the drilling operation proceeds with the results that the openings in the tube sheet, or the series of openings in the baffle plates, will not be drilled perpendicularly but will extend at a slight angle to the perpendicular and will also not have proper diametrical dimensions. These conditions increase the difficulty of the work of fitting the tubes in the baffle openings and the tube sheet, militate against the proper fitting of the tubes, and involve a substantial increment of manufacturing expense. Extreme slowness in the work of spotting and drilling is unavoidable, due to the physical effort involved in shifting the jig and supported parts and to the extreme care required in the alinement of the template openings or tube sheet recesses with the drill bit. This necessary slowness, of course, involves a substantial additional increment of manufacturing expense. In general the work is so arduous and exacting that it has not been possible to keep trained workers continuously on this particular job for relatively short daily periods of more than a few months, at most.

The invention has for its objects to overcome the objections above noted. Stated affirmatively the objects of the invention are to provide for the shifting of the jig and the parts which it carries upon the bed plate of the drilling machine with ease, accuracy and negligible physical effort; to promote accuracy in the alinement of the template openings or tube sheet recesses with the drill bit whereby perfect alinement is achieved with substantial uniformity; in the infrequent instances where there may be a slight misalinement with the template openings or tube sheet recesses, to provide for automatic correction with resultant perfect alinement, this involving the cooperation of the drill bit with the walls of the template openings or tube sheet recesses in effecting such slight shifting of the jig carried assembly as may be necessary; greatly to increase the speed with which the spotting and drilling operations may be carried out and thereby to effect a further substantial reduction in manufacturing expense; to provide for the uniform drilling of truly normal or perpendicular tube sheet openings and series of baffle openings, the permissible depth to which the tube sheet openings may be drilled being greatly increased, as compared to the practice heretofore, even to the extent of permitting, with substantial advantage of manufacturing economy, the simultaneous accurate drilling of two stacked tube sheet blanks, only the uppermost of which requires spotting, an operation which has not heretofore been practically possible with tubes of such small diameter as the order of one-quarter of an inch; and to enable the operator easily and accurately to effect and control the movement of jig carried assemblies of substantially greater weight than has been practically possible with the practice heretofore employed, this capacity being of substantial practical and economic value, for example, in connection with the simultaneous drilling of two large and heavy stacked tube sheet blanks.

The apparatus, in accordance with the invention, includes the jig and the bed plate of the drilling machine as companion elements having adjacent cooperating flat or plane bearing faces, the bed plate providing primary support for the jig; and is characterized by the provision in one, i. e. either, of the companion elements of a fluid receiving recess open to its bearing face and in opposed relation to the bearing face of the other companion element, the recess being also open to a duct through which is forced into it by the action of a pump included as an element of the apparatus, a constantly flowing fluid of a character upon which supported parts are freely movable and also of a character to build up a pressure in the recess sufficient to effect the uniform lifting of the jig from the bed plate of the drilling machine and at the same time to counteract the pressure exercised by the drill bit, the fluid providing secondary support for the jig and avoiding metal-to-metal contact of the companion elements. The lifting of the jig provides between it and the bed plate a space or passage wholly filled by a constantly escaping supporting film of the fluid supplied by the pump which film, in any position to which the jig may be moved in the course of the operations of drilling the hundreds of holes, provides a constant seal for the recess, thereby insuring that the fluid in the recess will at all times be under adequate pressure for the purposes in view. Upon this film the assembly of the jig and parts which it carries "floats," that is to say is at all times freely movable by applied manual effort, to any necessary extent and in any desired direction, the jig in such movement being unguided whereby the extent and direction of its movement is under the control of the operator to be exercised in accordance with his skill and care.

In the accompanying drawings:

Figure 1 is a schematic side elevation showing a preferred form of the apparatus of the invention in association with a standard drilling machine.

Figures 2 to 12 are views showing details of a preferred form of the apparatus, this form being comprehended in the side elevation shown in Figure 1.

Figure 2 is a plan view, partly broken away, showing the relation, as an assembly, of the jig, the template and a series of baffle plates in which holes are to be drilled.

Figure 3 is a view partly in side elevation of the assembly shown in Figure 2 and partly in vertical section on the line 3—3 of Figure 2.

Figure 4 is a view similar to Figure 3 but showing the template as used for the spotting of a tube sheet blank which, as shown in this figure, is of the standard "skirted" form.

Figure 5 is a vertical sectional view showing the drilling of a flat tube sheet blank which is supported upon the jig by means of interposed blocks.

Figure 6 is a vertical sectional view showing the operation of drilling two flat stacked tube sheet blanks, the upper tube sheet blank which has been spotted serving, in effect, as a template for the lower tube sheet blank which latter is supported upon the jig by means of interposed blocks.

Figure 7 is a plan view of a jig supported assembly as movable upon the bed plate of the drilling machine, the selectivity of the various directions and extents of movement being schematically suggested by dot and dash lines.

Figure 8 is a fragmentary vertical section on the line 8—8 of Figure 7.

Figure 9 is a plan view of the jig per se.

Figure 10 is a vertical sectional view of the jig on line 10—10 of Figure 9.

Figure 11 is a bottom plan view of the jig.

Figure 12 is a partial vertical sectional view on the line 12—12 of Figure 2 showing the operative relation between the spotted tube sheet and the drill bit and also showing an instance of a slight misalignment of the drill bit with a tube sheet recess.

Figures 13 to 15 are views showing an alternative or modified form of the apparatus.

Figure 13 is a schematic side elevation showing the modified form of the apparatus in association with a standard drilling machine.

Figure 14 is a perspective view showing the operative association of the bed plate of the drilling machine and the floating jig.

Figure 15 is a transverse sectional view on the line 15—15 of Figure 14.

The drilling machine M is shown generally in Figure 1 and may be of any appropriate construction having a drill bit B and a bed plate P which latter, in accordance with standard practice, may be mounted for vertical adjustment.

For the purposes of exposition the invention will be described in connection with the manufacture of heat exchangers. It will, however, be understood that its utility comprehends the manufacture of any device wherein a large number of openings or spotting recesses is to be formed by a drilling machine and the work, carried upon a jig, is to be shifted by the operator upon a supporting bed plate in various directions and through various extents, as determined by the operator, relatively to the drill bit, for the purpose of the successive alinement of the drill bit with the several template openings or spotting recesses in the work.

Referring to Figures 1 to 12:

The jig is shown at 1, the template at 2, the baffles of a heat exchanger at 3, the skirted tube sheet blank (Figure 4) at 4 with its skirt 5, the spotted flat tube sheet blank (Figure 5) at 4a and the lower unspotted flat tube sheet blank (where the flat tube sheets are stacked in pairs) at 4b (Figure 6).

The assembly of the jig and the parts supported upon it is maintained by the usual hold-down clamps 6 which are connected to the jig by screws 7, the jig having openings 8 (Figures 9 and 10) into which the shanks of the screws are threaded.

Figures 2 and 3 show the assembly when tube openings are to be drilled in baffle plates in accordance with the openings 9 in the template. In standard heat exchangers the baffle plates are arranged in staggered relation whereby there is one series of baffle plates at the right of the heat exchanger and another series at the left, the baffle plates of the two series having overlying portions and providing a sinusoidal path of flow for the fluid which flows among the tubes from one end of the heat exchanger to the other. In the manufacture of heat exchangers the baffle plates of a corresponding series are stacked to a suitable depth, for example of the order of three inches, and are supported upon a wooden plate 10 which rests directly upon the jig, the template being supported upon the series of baffles and being engaged by the horizontal elements of the hold-down clamps 6. It will, of course, be understood that the hold-down clamps will be selected in accordance with the depth to which the baffle plates are piled or that conventional shop devices will be used in connection with the hold-down clamps to compensate for variations in the depth to which the baffle plates may be piled. In this connection the template, of course, serves as a clamping element for the baffle plates which may be directly drilled (no spotting being required). Since the template serves as a clamp for the baffle plates all possibility of the chips or shavings incident to the drilling operation working between the baffle plates and deforming them is eliminated. The wooden supporting plate 10 accommodates the lower end of the drill bit, without injury to it, when the bit has pierced the lowermost of the series of baffle plates.

Figure 4 shows the assembly when a tube sheet blank 4 of skirted form is to be spotted. In this case the skirt 5 of the tube sheet blank 4 rests upon the jig 1 and the template 2 rests upon the tube sheet blank 4, the parts being held in clamped relation by the hold-down clamps 6 as above described. Figure 4 shows the bit B operating through a hole 9 in the template to form a spotting recess in the tube sheet blank 4. Figure 12 shows the spotting recesses 11 so formed, these of course conforming in number and arrangement to the openings 9 in the template.

When the tube sheet blank has been completely spotted the template is removed and the blank is directly clamped to the jib by appropriate hold-down clamps 6 (Figure 12). Thereupon the tube openings 12 are drilled in the tube sheet blank in conformity to the spotting recesses 11, this operation being sufficiently indicated by Figure 12 wherein certain tube openings 12 are shown as completely formed and others, determined as to location by the spotting recesses 11, are yet to be formed. The skirt 5 provides a clearance 13 into which the lower end of the bit B may extend when an opening 12 has been completely formed in the tube sheet blank.

Figure 5 shows the operation of drilling a flat spotted tube sheet blank 4a. In this case the tube sheet blank is supported in spaced relation to the jig by interposed blocks 5a which, in respect to the drilling operation, correspond functionally to the skirt 5 in that they provide a clearance 13a into which the lower end of the bit B may extend when an opening 12 has been completely formed in the tube sheet blank, the clearance 13a, of course, corresponding to the clearance 13 above described.

Figure 6 shows the operation of drilling a pair of stacked flat tube sheet blanks of which the upper one 4a has been spotted as above described and the lower one 4b is unspotted. In this case the lower tube sheet blank 4b is supported upon the blocks 5a which provide the clearance 13a above described.

In any of the operations of drilling tube openings in the baffle plates, spotting the tube sheet blank or drilling the tube openings 12 in the tube sheet blank, the assembly of the jig and the parts which it carries is shifted, for each opening to be drilled, upon the bed plate P relatively to the drill bit B in order to aline the drill bit successively with the template openings 9 or spotting recesses 11, this operation in accordance with standard practice as heretofore conducted having all the objections set forth in the eighth paragraph of this specification.

In the apparatus preferred a recess 14 is formed in the underface of the jig and is bounded and delimited by a surrounding part 15 which has an engaging surface 16 of plane character. The recess 14 is preferably, although not necessarily, centrally or symmetrically located and of circular form and the part 15, with its plane engaging surface 16 is preferably, although not necessarily, of annular outline. Where the part 15 is of annular outline, as shown and preferred, the jig will have corner portions 17 which project beyond the part 15 and in which are formed the openings 8 for the hold-down clamp screws 7. The recess 14 is in communication with a duct 19 formed to accommodate a projecting nipple 20. The fluid under pressure which raises the jig from the bed plate is delivered into the recess 14 through the duct 19. As shown and preferred the duct 19 is provided in the part in which the recess is formed and is in communication with the recess through its basal wall, this communication being afforded by a port 18 open to the basal or horizontal wall of the recess.

The nipple 20 is connected to a hose section 21 (Figure 1) which leads from a suitable pump 22 supported upon appropriate frame parts of the machine M. The pump 22 forces a suitable jig supporting fluid into the recess 14. While compressed air may be used as the supporting fluid, it is preferable to use a liquid L which may be of any suitable free flowing character upon which the jig caarried assembly A (Figure 7) may be freely movable, i. e. with negligible physical effort, relatively to the plate P and in any direction and to any extent that may be required for the accurate alinement of the drill bit B with a particular template opening or tube sheet spotting recess. In practice I have found the ordinary coolant liquid used in connection with metal working machines, lathes, planes, milling machines, drilling presses, etc., to be economical and entirely satisfactory for the purpose in view. The liquid is maintained in a tank 23 and its flow circuit consists of a pipe connection 24 between the tank 23 and the pump 22, the hose section 21, the recess 14, a gutter G surrounding the plate P and a return hose section 25 leading from the gutter to the tank 23.

With the pump 22 in operation the function of the recess 14 is to provide for an adequate body of liquid under suitable pressure to lift the jig from the bed plate P to a uniform extent sufficient to provide between the jig and the bed plate a space 26 through which the liquid, at all times completely filling the space, may escape, the plane surface 16 of the jig resting upon the sheet or film F of constantly escaping liquid. This operational characteristic is clearly shown in Figures 3, 4 and 8.

It is requisite that the capacity of the recess 14 be adequate for this purpose and recesses of varying diameters or transverse dimensions may be used. It is also requisite that the relative proportions of the bed plate, the jig and the diameter of the recess 14 be such that to whatever position the template or tube sheet may be moved relative to the drill bit B the recess will not extend across any marginal edge of the opposing companion element, i. e., the bed plate, that is to say the recess will at all times lie within the marginal edges of the bed plate P, thereby to insure that the seal of the liquid provided for by the recess and the space 26 will not be broken. In the example herein suggested, viz., a tube sheet to accommodate 1425 tubes, each of one-quarter inch diameter, the approximate diameter of the tube sheet is fourteen inches. A tube sheet of this diameter is assumed in the drawings. With such a tube sheet the diameter of the recess 14 may safely be of the order of two-thirds of the diameter of the tube sheet. The plane surface 16 should rest uniformly throughout its area upon the film F of the escaping liquid. For this purpose it is ideal that the recess 14 be so formed as to effect at all points of its bounding wall uniform distribution of the escaping liquid. It is in this aspect that the circular form of the recess is preferred. The plane surface 16 may vary in area. In general it is preferred that its area be such as to provide a relatively wide, flat and uniform bearing upon the film F of escaping liquid. It is preferred, although not necessary, that the longer diameter of the transverse dimension of the longer plane surface 16 be at least equal to the diameter of the tube sheet blank. As shown and preferred the transverse dimension of the jig is somewhat greater than the diameter of the tube sheet blank and the major diameter or transverse dimension of the plane surface 16 touches the vertical walls of the jig (Figure 9). The liquid which escapes as a film through the space 26 flows along the surface of the plate P into the gutter G whence it will be returned by the hose section 25 to the tank 23.

For all practical purposes the film of liquid F opposes negligible frictional resistance to the movement relatively to the bed plate P of the jig carried assembly A. Hence such movement in any direction and to any extent desired may be accomplished with negligible physical effort whereby the operator will be free from fatigue at the end of a day's work.

In spotting the tube sheet blank and drilling the openings 12 therein or in drilling the openings in the baffle plates 3 the jig carried assembly A must be moved, according to the operator's choice, in various directions and through paths of various lengths. This is sufficiently indicated in Figure 7 wherein a starting position of the jig carried assembly A is shown in full lines and other positions thereof, typical of the hundreds of positions to which the jig carried assembly must be moved, are shown at X, Y and Z in dot and dash lines.

The starting position of the jig carried assembly A may, according to the operator's choice, be any position within the permissible range of movement of the jig. The permissible range of movement of the jig, i. e., its field of permissible movement, due to the relative linear proportions of the jig and the bed plate, is such that the jig may be moved in any direction and through such degree as may be necessary for the complete drilling of the tube sheet. When the jig is of the preferred construction above described its degree of permissible movement, and with the accommodation of the tube sheets of maximum diameter in mind, may be such that any of the vertical edges of the jig may be very close, i. e., substantially coincident with, or even slightly beyond, a point located at the center of the area of the bed plate. The movements of the jig may be straight movements in any direction, i. e., in the direction of the horizontal dimensional lines of the bed plate or at angles to such lines or they may be turning movements about the axial center of the jig, or they may be a combination of the two. In any of these movements the seal provided by the escaping liquid film F is constantly maintained, thereby to insure the constant maintenance of adequate pressure of the liquid which fills the recess 14, and the jig, bearing the weight of the assembly A, is held lifted to a uniform extent from the bed plate sufficient to provide the space 26 through which the film F flows, the jig thereby being constantly maintained in a true horizontal plane without any liability of the impairment of its position in such plane by the thrust of the bit B.

The ease with which the jig carried assembly may be moved, and consequently the ease of the control of the alinement with the bit B of a particular template opening 9 or a spotting recess 11, is such that the operator will have no difficulty in effecting the alinement of the drill bit B with a template opening 9 or a supporting recess 11, as the case may be. However if, for any reason, the operator should not effect perfect alinement the pointed lower end of the bit B will exert a cam action upon the wall of the template opening 9 or the recess 11 (sufficiently suggested in Figure 12) which will be effective, the jig carried assembly being virtually freely movable upon the film F, automatically to shift the assembly into a position wherein perfect alinement is achieved, thereby eliminating the possibility of damage of the template or spoilage of the tube sheet blank and insuring truly perpendicular openings of proper diameter in the tube sheet blank and truly perpendicular series of openings of proper diameter in the baffle plate 3.

Many hundreds of operations of moving the jig carried assembly and of alining the drill bit B with the template opening 9 or the spotting recess 11 are required, namely somewhat more than three times the number of template openings, these operations involving (1) the provision of spotting recesses 11 in the tube sheet blank 4 conforming in number to the template openings 9, (2) the drilling of the opennigs 12 in the tube sheet blank and (3) the drilling of the openings in the baffle plates, the operations being repeated in the two series of baffle plates as to the openings which will lie within the overlapping areas of adjacent baffle plates as assembled in the heat exchanger. Thus in the case of the example suggested, namely a heat exchanger requiring 1425 tubes, there will be 1425 shifts of the assembly A relatively to the bed plate P and 1425 operations to aline the bit B with the several template openings 9 in order to effect the tube sheet blank spotting operation; there will be another 1425 similar shifts of the assembly A and another 1425 similar alining operations in order to effect the drilling of the openings 12 in the tube sheet blank; and there will be more than 1425 similar shifting operations and more than 1425 similar operations of alining the drill B in order to effect the drilling of the openings in the baffle plates 3, in all more than 8550 combined shifting and alining operations. These operations for the reasons above pointed out have been exceedingly arduous, exacting and fatiguing and have been accompanied by undue hazard of injury to the template and spoilage of the tube sheet blanks and by a substantial increment of manufacturing cost. It will therefore be seen that the invention in enabling these operations to be carried out with negligible physical effort eliminates the arduousness and exacting character of the work, spares the operator physical fatigue and the fatigue of eye strain, eliminates the hazards of damage to the template or spoilage of the tube sheet blanks, insures that the openings in the tube sheet blank and the series of openings in the baffle plates will at all times be drilled in truly perpendicular relation and will be of proper diameter, enables the drilling of truly directed openings in the tube sheet blank to be carried to a greater depth than heretofore posible, even to the extent of the simultaneous drilling of openings in two stacked tube sheet blanks, enables jig carried assemblies to be used which are heavier than has heretofore been practically possible, and greatly increases the speed with which the operations may be performed, thereby reducing in valuable degree an increment of manufacturing cost heretofore substantial.

Referring to Figures 13 to 15:

In this modified or alternative construction the recess for the pressure exercising liquid is shown at 14a and is formed in the upper surface of the bed plate P, thereby to enable the use of jigs, as 1a, of standard form, i. e. having their under faces flat and uniformly plane. The surrounding part of the bed plate which bounds and delimits the recess 14a provides the supporting part 15a having a plane engaging surface 16a adjacent the plane under face of the jig. The recess 14a is in communication with a duct 19a formed in the bed plate and open to the base of the recess. A projecting nipple 20a is connected to the duct 19a and a hose section 21a leading from the pump 22 is connected to the nipple 20a, the flow circuit of the liquid being otherwise as described in connection with Figures 1 to 12.

The constantly flowing liquid under pressure in the recess 14a raises the jig from the bed plate and provides the space 26a between the bed plate and the jig, the liquid wholly filling and constantly escaping from this space into the gutter G whence it is returned to the tank 23. The jig floats upon the liquid film F which occupies the space 26a and is moved relatively to the bed plate and drill bit in the manner above described and with the same operative effects. As in the construction shown in Figures 1 to 12 the relative proportions of the jig, the bed plate and the recess 14a are such that the recess 14a will be within the marginal edges of the opposed companion element in any position to which the assembly A may be moved for any spotting and drilling operations. In other words the jig may be moved to any position required for any spotting and drilling operations without the liability of its edges being moved across the recess 14a of the opposed companion element, i. e., the bed plate P, the seal provided by the film of liquid F escaping through the space 26a being thus at all times maintained.

I claim:

1. Floating jig apparatus for use with a drilling machine which apparatus comprises, as companion elements, a bed plate and a jig, the bed plate furnishing primary support for the jig, the companion elements having adjacent cooperating flat plane bearing faces, one of the companion elements having a recess opposed to the flat bearing face of the other element and also having a part bounding and delimiting the recess and which provides its flat bearing face, one of the companion elements having a duct in communication with the recess, and a pump for delivering fluid under such pressure from the duct into the recess that the jig will be lifted above the bed plate, the fluid providing secondary support for the jig in which all metal-to-metal contact between the jig and the bed plate is avoided, the area of the recess being such that the jig will be lifted to a uniform extent above the bed plate, the cooperating flat plane bearing faces being operative when the jig is so lifted to delimit a passage between the jig and the bed plate through which the fluid will uniformly flow in all horizontal directions and at the same time will provide a sealing film in respect to the fluid under pressure in the recess, the relative proportions in areal extent of the bed plate and the jig being such that, maintaining the seal provided by the fluid flowing through the passage, the jig may be moved horizontally relatively to the bed plate in any direction and to any extent within a field of adequate area for the spotting of the work to be drilled or for the drilling of the work.

2. Floating jig apparatus as set forth in claim 1 wherein the recess is formed in the under face of the jig.

3. Floating jig apparatus as set forth in claim 1 wherein the recess is formed in the bed plate.

4. Floating jig apparatus as set forth in claim 1 wherein the duct is formed in the element which is provided with the recess and is open to the recess.

5. Floating jig apparatus as set forth in claim 1 wherein the recess is formed in the under face of the jig, is of circular outline and is located substantially centrally or symmetrically of the jig.

6. Floating jig apparatus as set forth in claim 1 wherein the recess is formed in the under face of the jig and the duct is formed in the jig and communicates with the recess through its basal wall.

JAMES R. WILSON.

REFERENCES CITED

The following references are of record in the file of this patent:

UNITED STATES PATENTS

| Number | Name | Date |
| --- | --- | --- |
| 629,140 | Vollkommer | July 18, 1899 |
| 775,923 | Holmes | Nov. 29, 1904 |
| 2,266,928 | Walker | Dec. 23, 1941 |

FOREIGN PATENTS

| Number | Country | Date |
| --- | --- | --- |
| 101,292 | Great Britain | May 10, 1917 |